Oct. 29, 1957　　　W. E. BOCK　　　2,811,267
FEEDING MECHANISM CONTROL SYSTEM
Filed Feb. 14, 1952　　　6 Sheets-Sheet 6

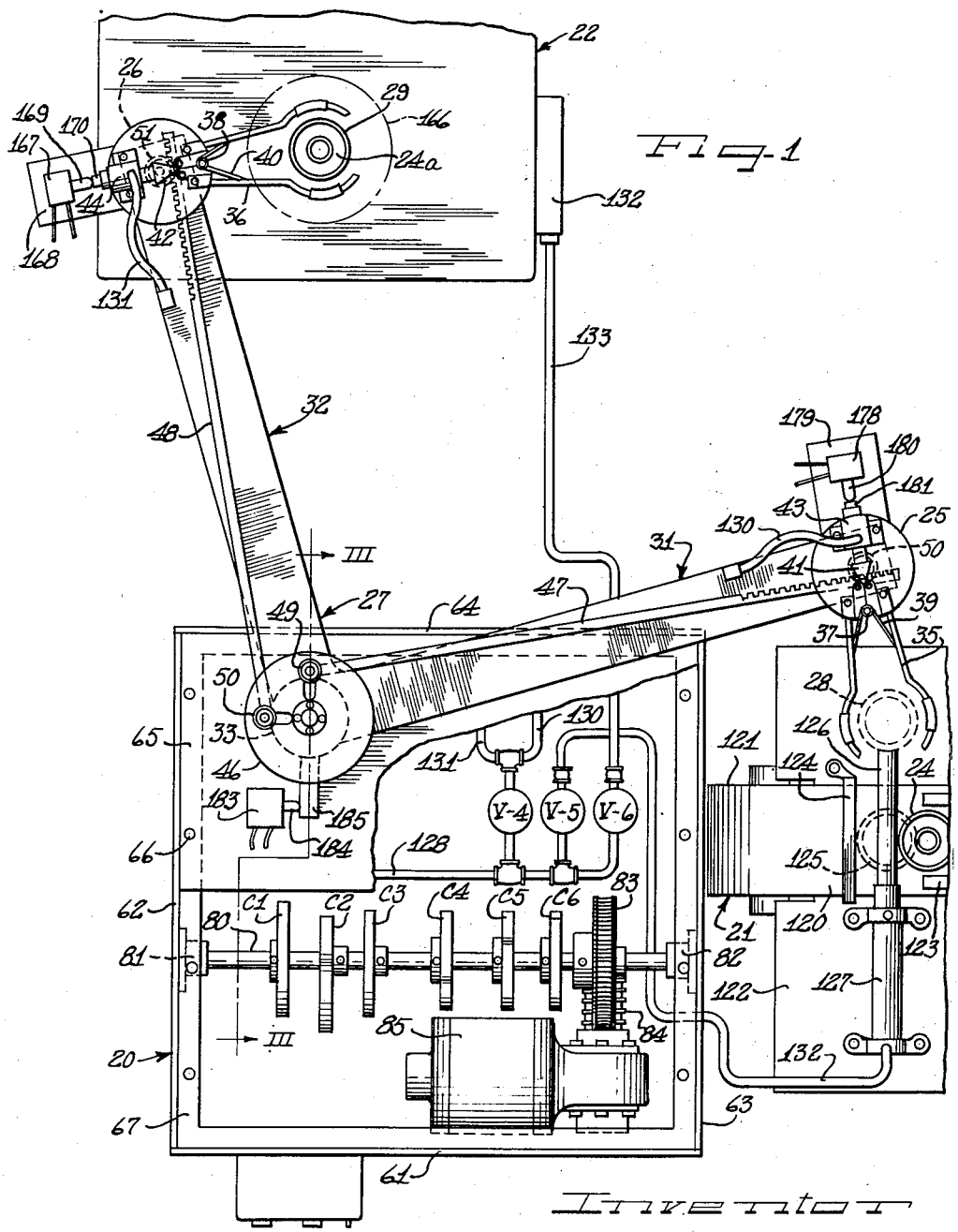

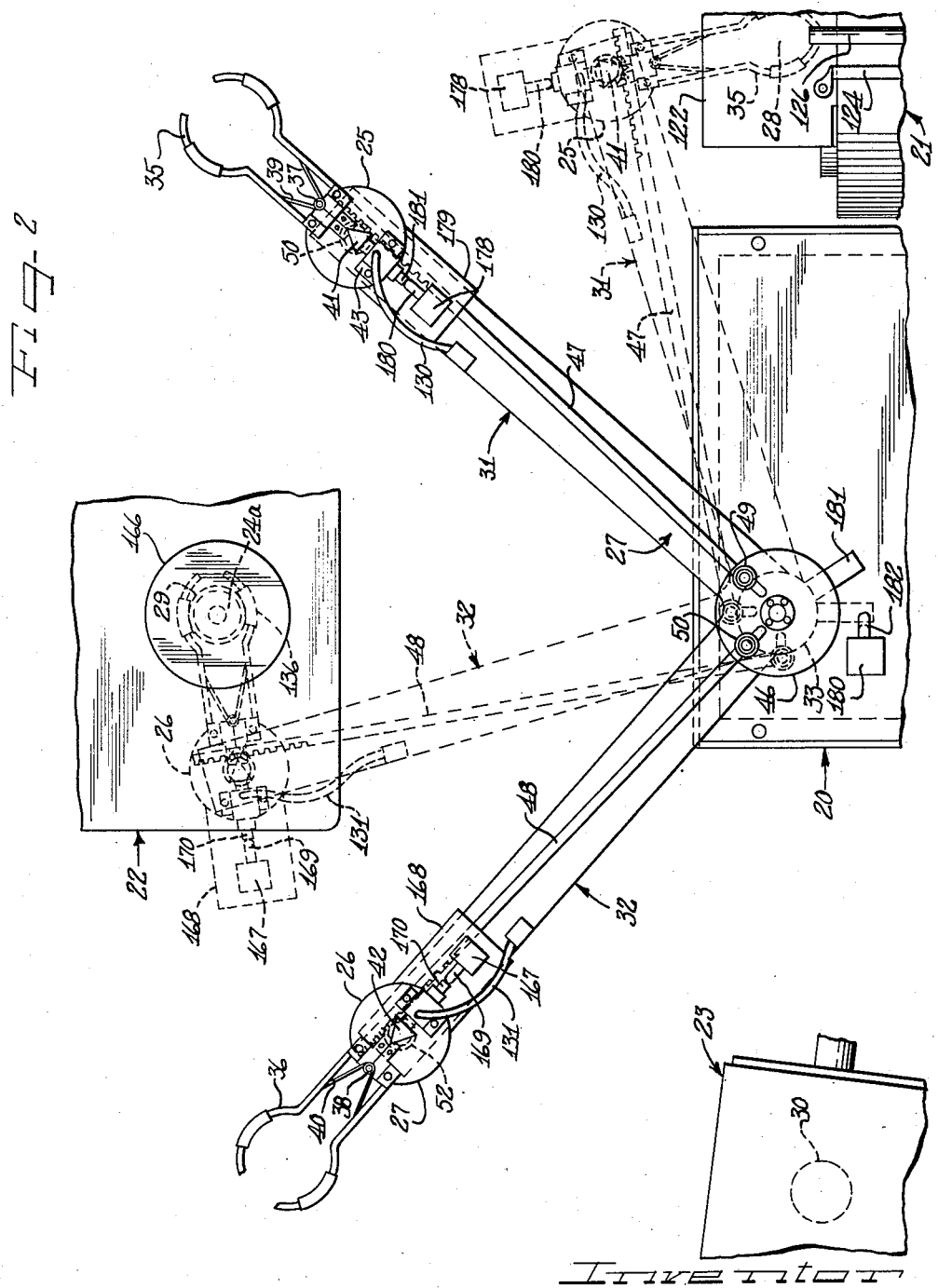

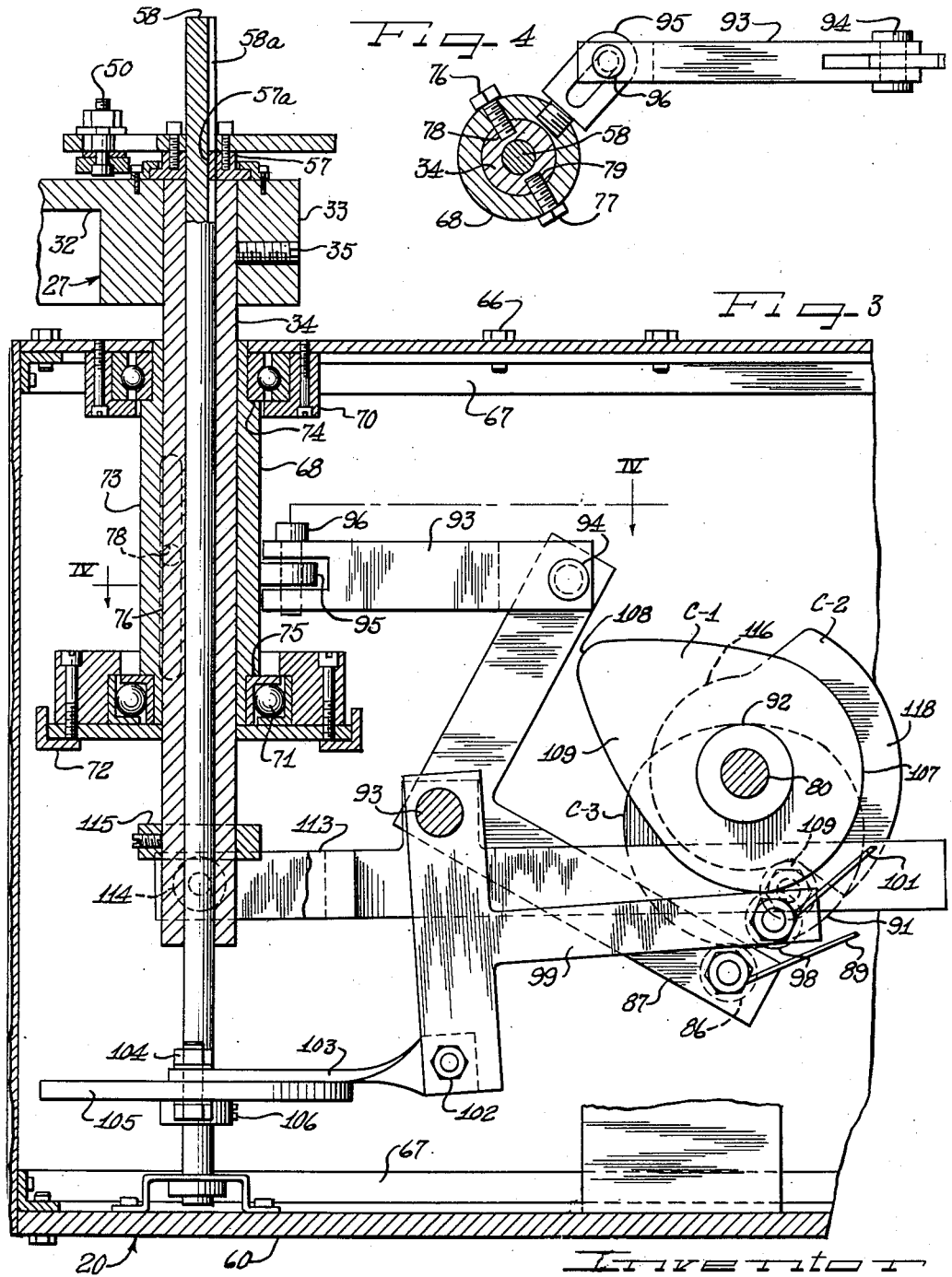

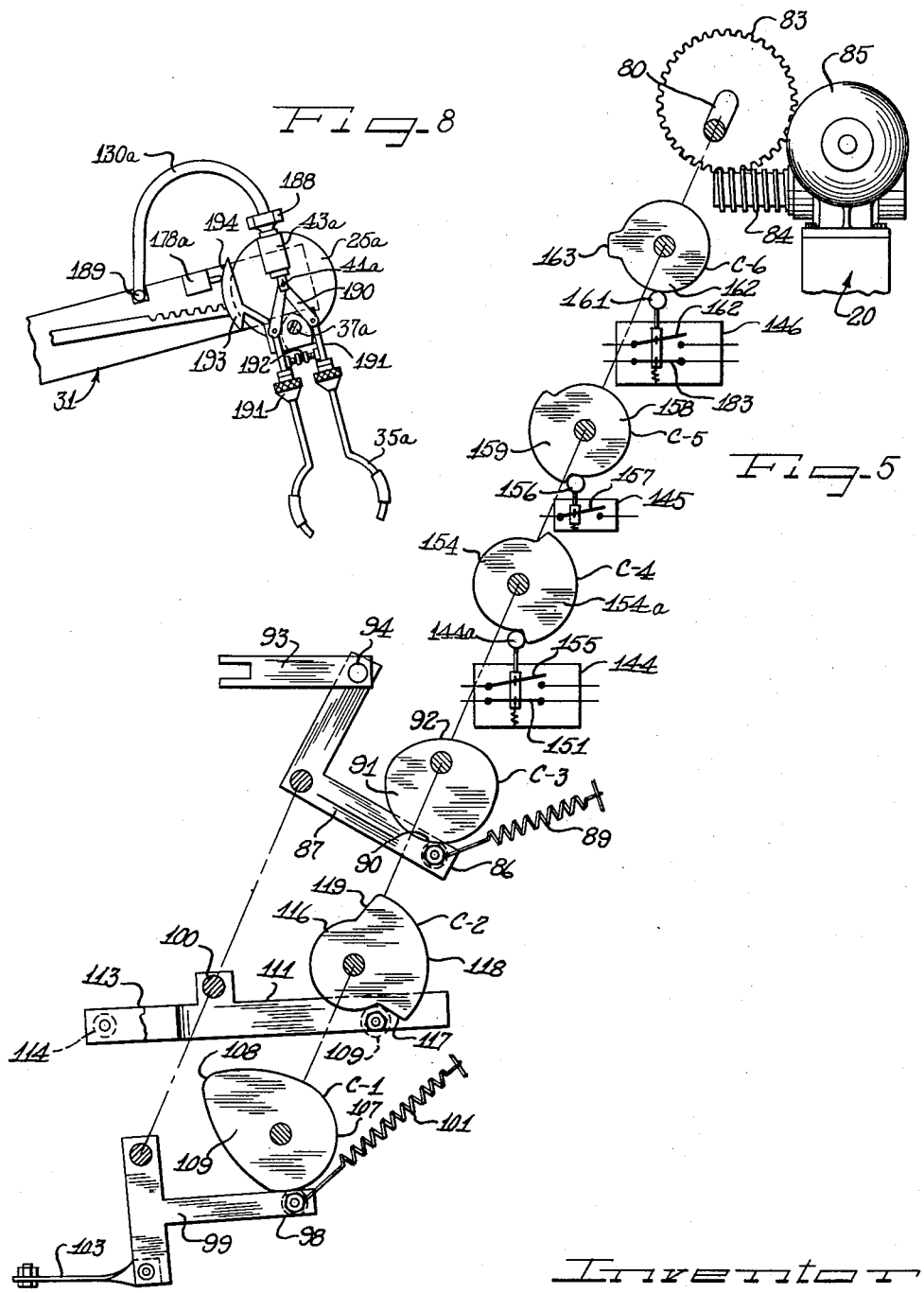

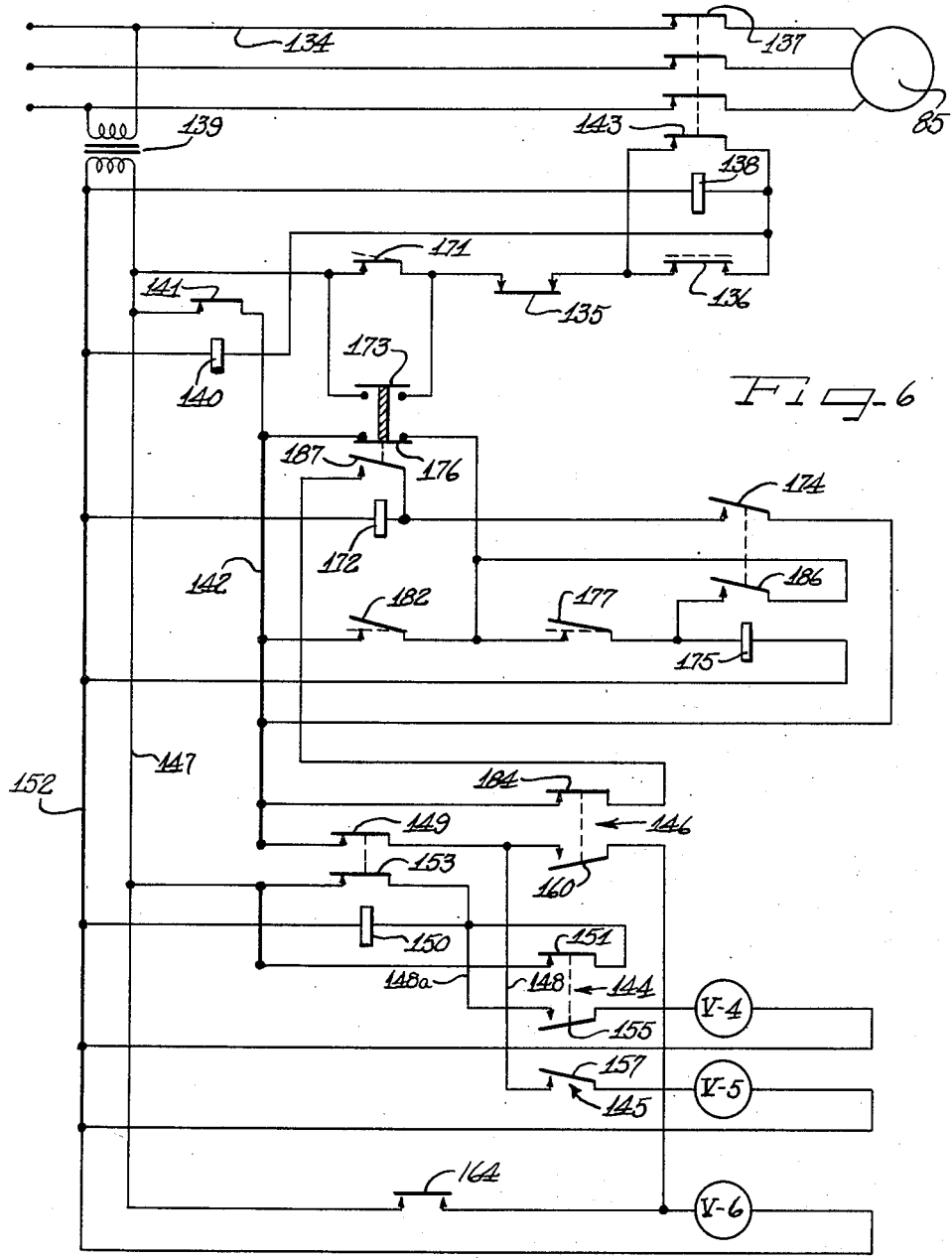

Inventor
Walter E. Bock

United States Patent Office 2,811,267
Patented Oct. 29, 1957

2,811,267
FEEDING MECHANISM CONTROL SYSTEM

Walter E. Bock, Chicago, Ill., assignor to Magnaflux Corporation, Chicago, Ill., a corporation of Delaware Application February 14, 1952, Serial No. 271,521

15 Claims. (Cl. 214—151)

This invention relates to article transfer or feeding mechanisms, and more particularly to a control arrangement for transfer devices of the type well adapted to move workpieces from one machine to another, or from one work station to another, in sequence with the operations of a machine performing work on the pieces.

In the commercial production of many articles various forming, stamping, punching, grinding, polishing and other operations may be required, and such operations are often performed in sequence in a single machine, or in a battery of different machines, with the workpieces moved from station to station for the various operations.

It is an object of my invention to enable workpieces to be transferred between such work stations, and the like, automatically and with safeguards against faulty operation of the machine, or machines.

A further object of my invention is to provide a novel combined electrical and pneumatic control system so constituted and arranged as to be readily incorporated in a work transfer device for use with different types of machines and which, if so desired, may be used to govern operations of the associated machine.

Another object of this invention is to eliminate the necessity of personal supervision of my transfer device by the provision of means sensitive to conditions of operation and responsive to the occurrence of an improper transfer or positioning of a workpiece to stop the operation of the transfer device.

A further object of this invention is to avoid stoppage of the operations of my transfer device during such periods as recur in production when the supply of workpiece blanks is momentarily depleted and the functioning of the device is otherwise normal. Such momentary depletions of the workpiece supplies are, for example, quite common where the workpieces are uniformly advanced toward the transfer device past an inspection station at which an operator removes substandard workpieces.

Yet another object of this invention is to provide an electrical control means operative in timed sequence with certain mechanical portions of my apparatus to control certain other mechanical portions and, importantly, to control the operation of an associated processing machine.

Yet a further object of this invention is to provide a safeguard, should a workpiece be improperly positioned at an associated machine or be improperly transferred from the machine, whereby both the transfer device and the machine will be stopped to permit the operator to rectify the faulty occurrence.

Another object is the provision of an electric control means whereby an automatic sequential operation of the transfer device and its associated machine, or machines, may be properly initiated by closing a single switch, and whereby the machine may be actuated independently of the transfer device, if so desired.

Other and further objects of the present invention will be apparent from the following description of exemplary embodiments thereof, which are illustrated in the accompanying drawings.

In the drawings:

Figure 1 is a top plan view of a transferring device embodying the principles of my invention, a portion of the top cover thereof being cut away to expose certain underlying mechanisms;

Figure 2 is a fragmentary top plan view showing the transfer arms in different operative positions;

Figure 3 is a detailed sectional view taken substantially on the line III—III of Figure 1;

Figure 4 is a detailed sectional view taken substantially on the line IV—IV of Figure 3;

Figure 5 is an exploded, isometric, diagrammatic view of the timing mechanism associated with the cam shaft of my device;

Figure 6 is a diagram of the electrical control arrangement;

Figure 8 is a fragmentary top plan view of a modified load member.

The transfer device

Figure 7:
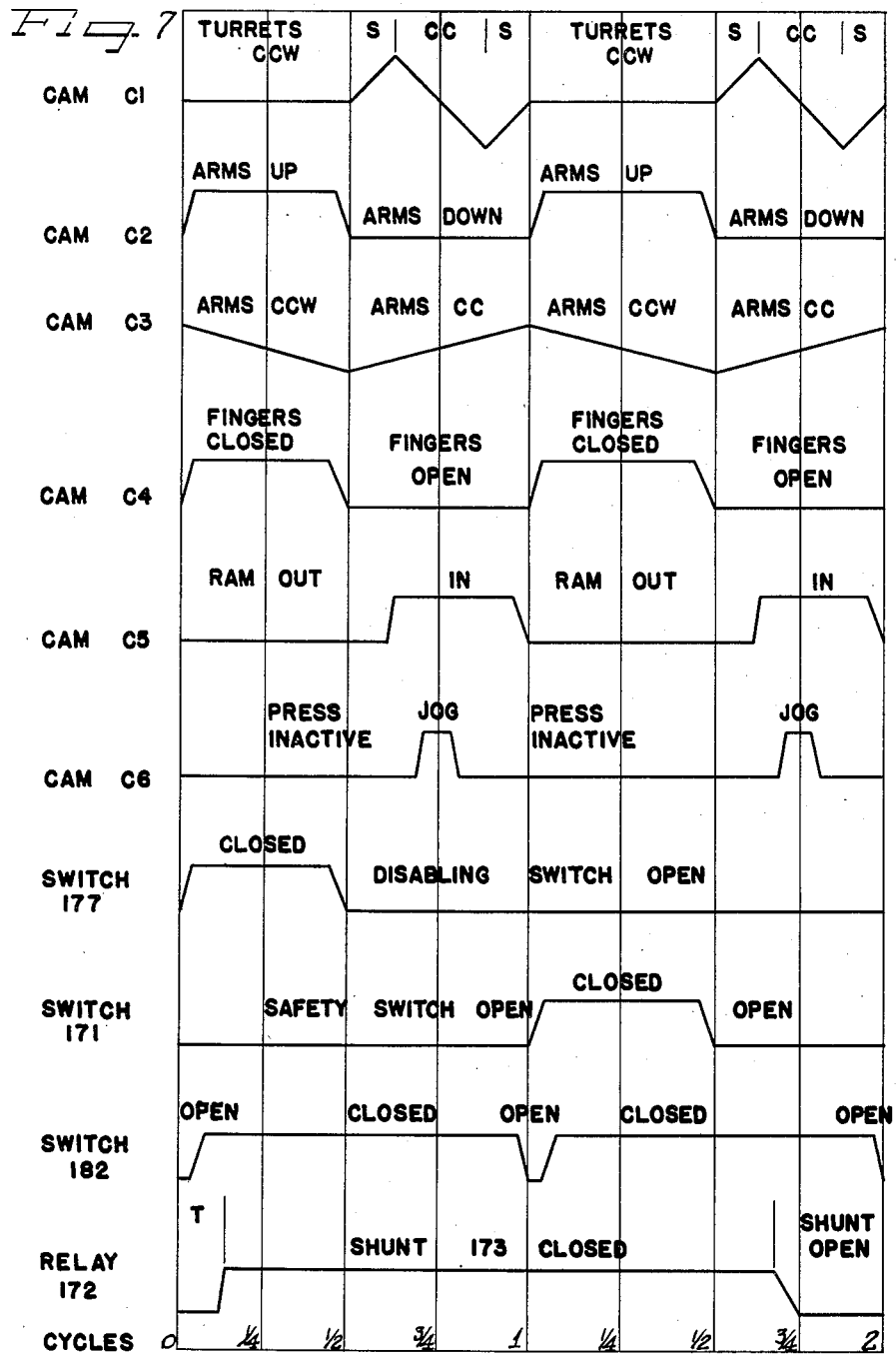
Figure 7 is a timing chart showing the time and polarity of operation of various elements during two cycles of article transfer, the first cycle being characterized by the absence of a workpiece blank at the work load station.

For the purposes of disclosing the principles of my invention, a material handling or transferring device 20 is shown operatively associated with a supply conveyor 21, a punch press 22 and a discharge conveyor 23.

It will be evident that the transfer device 20 may be associated with other mechanisms and may itself have varying structural embodiments of any kind with which my novel control arrangement may be advantageously used. In lieu of the punch press 22, which I have illustrated as a typical machine with which the exemplary transfer device 20 may be associated, other suitable machines for production and otherwise may be used, such as arbor presses, shell-loading machines, assembly machines and the like, without departing from the purview of my invention.

Likewise, it will be understood that the supply conveyor 21 and the discharge conveyor 23 are shown merely to illustrate suitable means for feeding workpieces 24 to the transfer device 20 and for feeding finished workpieces 24a away from the transfer device 20 and that other types of feeding and discharging devices may be substituted therefor without departing from the purview of my invention.

In order that the characteristics of my novel control arrangement may be made evident, I have provided the transfer device 20 with a work load member 25 to receive the workpiece blanks 24 for transfer to the punch press 22, and a work discharge member 26 to transfer the finished workpiece 24a to the discharge conveyor 23. During a transfer cycle the work load member 25 and the work discharge member 26 are oscillated about a common vertical axis by means of a carrier 27. To accommodate the members 25 and 26 for the transfer of workpieces 24 between a supply station 28, a punch press station 29 and a discharge station 30, the carrier 27 includes a load arm 31 and a discharge arm 32 supporting the load and the discharge members for individual rotation. These transfer arms 31 and 32 are joined integrally at an elbow 33 secured for co-rotation with a hollow vertical shaft 34.

To engage and hold the workpieces 24 and 24a which, in this instance, are shown to have a cylindrical configuration, the load member 25 and the discharge member 26 are of identical construction and include a pair of allochiral load fingers 35 and unload fingers 36 supported for pivotal clamping movement about pins 37 and 38, respectively. While the load fingers 35 and discharge fingers 36 are normally held in a spread-apart, open position by means of springs 39 and 40, respectively, the fingers may be moved together toward a clamping position by the action of wedge-headed plungers 41 and 42 when air is introduced into cylinders 43 and 44. Thus, in Figure 1 the fingers 35 and 36 are illustrated in open position and in Figure 2, for the same position of the arms 31 and 32, they are shown in dotted lines in a clamped position.

It will be clear that the load fingers 35 will serve to pick up workpiece blanks 24 at the supply station 28 and to deposit them at the press station 29 by suitable movement of the load arm 31 and actuation of the cylinder 43. The work discharge fingers 36 are correspondingly adapted to pick up finished workpieces 24a at the press station 29 and to deposit them at the discharge station 30. In order that the fingers 35 and 36 may be withdrawn from the deposited workpieces without upsetting them, it is desirable to confine movement of the fingers to substantially a straight withdrawal from the deposited workpieces.

To produce the necessary 180° rotation of the work load and discharge members 25 and 26 relative to the transfer arms 31 and 32 while confining these members to a straight withdrawal following each deposit of a workpiece at a work station, a headplate 46 carries rack bars 47 and 48 on pivot bolts 49 and 50 to mesh with and suitably rotate pinions 51 and 52 integral with the load and discharge members 25 and 26. The headplate 46 is supported in spaced relation to the elbow portion 33 of the transfer arms 31 and 32 for suitable rotation relative to the arms by means of a flanged collar 57 which is locked for turning with a shaft 58 by means of a key 57a engaged in a longitudinally extending keyway 58a. Thus, while the rack bars 47 and 48 are connected to the shaft 58, their turning of the load and discharge turrets 25 and 26 will depend on the independent relative rotation of the shaft 58 and the transfer arm shaft 34. Mechanism for turning the shafts 34 and 58 will be described presently.

The shafts 34 and 58 carrying the work carrier 27 for oscillation about a vertical axis are supported by a housing 59. This housing includes a bottom wall 60, a front wall 61, side walls 62 and 63, a rear wall 64, and a top wall 65, each fastened by means of bolts 66 to angle brackets 67. The shaft 34 is slidably mounted within a sleeve 68 journaled in a ball bearing 69 secured by a bracket 70 to the top 65 and by a thrust bearing 71 carried on rails 72 bridged between the sidewalls 62 and 63. The sleeve 68 has an outwardly stepped body portion 73 forming shoulders 74 and 75, respectively engaging the ball bearing 69 and the thrust bearing 71 to confine the sleeve 68 against vertical movement. As may be seen most clearly in Figure 4, the hollow shaft 34 is locked for co-rotation with the sleeve 68 by means of screws 76 and 77 extending into diametrically opposed, longitudinal keyways 78 and 79, respectively. It will be appreciated that the transfer arms 31 and 32 may be turned with the hollow shaft 34 by turning the sleeve 68, yet the hollow shaft 34 is free to reciprocate vertically to raise and lower the transfer arms 31 and 32, while the stationary shaft 58 journaled within the hollow shaft 34 is free to rotate independently of the rotation and vertical reciprocation of the hollow shaft 34, thereby to control the rotation of the work load member 25 and the work discharge member 26.

To correlate the functioning of the work carrier 27, the supply conveyor 21 and the punch press 22, I have provided a cam shaft 80 journaled in bearings 81 and 82 on the respective side walls 62 and 63 with cams C-1, C-2, C-3, C-4, C-5 and C-6 locked on the shaft for co-rotation therewith. The cam shaft 80 and the six cams are suitably rotated by means of a worm wheel 83 locked to the cam shaft 80 and driven by a worm gear 84 which is turned at a suitable speed by an electric timer motor 85. In particular, a periodic series of movements are mechanically imparted to the work carrier 27 during continuing energization of the timer motor 85 by the turning of the cams C-1, C-2 and C-3 as will now be explained.

As illustrated with clarity in Figures 3 and 5, clockwise rotation of the cam shaft 80, as viewed from the cams toward the worm wheel 83, first produces a significant movement in cam C-2. As illustrated in Figures 3 and 5, the position of the cam shaft 80 corresponds with the disposition of the work carrier 27 as illustrated in Figure 1. This position, which exists just prior to the picking up of the workpiece blank 34 at the supply station 28, will hereafter be referred to as the initial or zero position and may be located at the far left on the timing chart of Figure 7. The cams C-1, C-2 and C-3 are appropriately designated as linkage actuating cams and serve to raise and lower the work carrier 27, to oscillate the work carrier about its vertical axis defined by the hollow shaft 34 and to rotate the work load turret 25 and the work discharge turret 26. The cams C-4 to C-6, on the other hand, may appropriately be designated as switch actuating cams and function to control operation of the punch press 22, the load and discharge fingers 35 and 36, and the supply conveyor 21 by means of an electric control circuit illustrated in Figure 6.

Considering first the linkage actuating cams and, in particular, the cam C-3 which controls the rotary oscillation of the work carrier 27, it is observed that a cam follower roller 86, rotatably secured to a bell crank lever 87, is urged by a spring 89 against the apical portion 90 of lobe 91 of the cam C-3. As the cam shaft 80 turns the cam C-3 in a clockwise direction, the roller 86 will fall to the dwell 92 under the influence of the spring 89, thereby moving the bell crank lever 87 in a counterclockwise direction about the linkage pivot rod 100 which, being secured in a fixed position to the housing 59, offers a horizontal pivotal axis. A link 93 pivotally connected to the bell crank lever 87 by pin 94 and to eye bolt 95 threadedly secured to the sleeve 68 with a pin and slot lost motion connection 96 thereto, serves to convert the rotation of the bell crank lever 87 into rotation of the sleeve 68 and consequently, of the hollow shaft 34 and the work carrier 27.

It will be apparent that during the first one-half revolution of the cam shaft 80, which is appropriately designated as the first half cycle of the periodic transferring operation, the counterclockwise rotation of the bell crank lever 87, as viewed in Figure 3, will be converted into a counterclockwise rotation of the transfer arms 31 and 32, as viewed from above in Figure 1. This counterclockwise rotation of the transfer arms 31 and 32 will, by suitable proportioning of the cam C-3 and the operating linkage, suffice to move the work load turret 25 from the supply station 28 to the punch press station 29 and simultaneously to move the work discharge turret 26 from the punch press station 29 to the discharge station 30. Then, as the cam C-3 and cam shaft 80 complete one revolution, the bell crank lever 87 will be returned to the position shown in Figure 3 to thereby rotate the transfer arms 31 and 32 to their original position as shown in Figure 1. In succeeding cycles the transfer arms will repeat this rotary oscillation as graphed in Figure 7.

In picking up and depositing the workpieces 24 at the several work stations, the work transfer arms 31 and 32 oscillate through an arc intermediate their respective, associated work stations. In correspondence, then, with the oscillation of the work transfer arms 31 and 32, the work load turret 25 and the work discharge turret 26 are turned so that, at the clockwise or counterclockwise limit of transfer arm oscillation, the load fingers 35 and the discharge fingers 36 are properly positioned for the pickup or deposit of a workpiece at the appropriate work station. The work load member 25 and the work discharge member 26 turn through substantially at 180° arc counterclockwise as the transfer arms 31 and 32 turn counterclockwise, and clockwise 180° as the transfer arms turn clockwise. Moreover, in their clockwise movement, it is desirable that the load fingers 34 move off the workpiece blank 24 after it has been deposited at the punch press station 29, in a straight line and move toward the work load station 28 again in a substantially straight line, while the discharge fingers move in substantially a straight line in withdrawing from the deposited finished workpiece 24a at the discharge station 30 and in approaching a finished workpiece 24a at the punch press station 29.

To actuate the load and discharge turrets 25 and 26 in this desirable manner, the rack bars 47 and 48 are suitably actuated by changes in the relative position of the transfer arms 31 and 32 and the headplate 46. The headplate is turned with the shaft 58 by the action of cam C-1 on a cam follower roller 98 rotatably mounted on a T-shaped lever 99, which lever is thereby turned about the linkage pivot bar 100 against the bias of spring 101. The T-shaped lever 99 is connected by a bolt 102 to a link 103 which, by means of a lost motion pin-and-slot connection 104, acts to turn a plate 105 and the shaft 58, to which the plate 105 is locked by a set screw 106.

During the first half cycle of each transfer period, the roller 98 rides upon a circular dwell portion 107 of the cam C-1 without a change of position. It is during this first half cycle that the transfer arms 31 and 32 are moved in a counterclockwise direction, and their movement, coupled with the eccentricity of the pivot pins 49 and 50 carrying the rack bars 47 and 48, serves to produce an immediate and continuing rotation of the load and discharge turrets 25 and 26. In contrast, during the return or clockwise movement of the transfer arms 31 and 32, the advance of the roller 98 toward and away from the apical portion 108 of the lobe 109 produces a turning of the headplate 46 relative to the transfer arms 31 and 32. As a result, the load finger 35 and the discharge finger 36 move in substantially straight lines during their withdrawal in a clockwise direction from the punch press station 29 and discharge station 30, respectively.

The full line position of the transfer arms 31 and 32 and the work load turret and work discharge turret 26 in Figure 2 occurs at the three-quarter position of the cycle, at which time the roller 98 is furtherest displaced by the apical portion 108 of the cam C-1. It will be noted that the T-shaped lever is pivoted on the linkage pivot bar 100. The portions during each cycle of transfer that are characterized by the non-rotative, relatively straight movement of the load and discharge fingers 34 and 35 are identified at S on the timing chart of Figure 7. The remaining portions of the cycles are characterized by alternating counterclockwise and clockwise rotation of the turrets 25 and 26, as indicated.

Thus, the transfer device with which my novel control arrangement is shown, by way of example, is safeguarded against disloding workpieces at the work stations by a carefully controlled movement of the load and discharge fingers 35 and 36 by which the workpieces are engaged and handled.

A further movement is imparted to the transfer arms 31 and 32 whereby the arms are moved to a vertically upward position for counterclockwise rotation and are returned to their "down" position for clockwise rotation. Cam C-2 controls this raising and lowering movement of the transfer arms by its engagement with the roller 109 rotatably mounted on the forked lever 111 to thereby rock the lever about its offset pivotal connection with the linkage pivot bar 93. A yoke 113 at the forked end of the lever 111 acts through rollers 114 to raise the transfer arms 31 and 32 by engaging the undersurface of a collar 115 locked to the hollow shaft 33a to which the transfer arms are attached.

At the initial position illustrated in Figure 3, the roller 109 is bearing against a circular dwell 116 adjacent the leading edge 117 of a circular lobe 118. Almost immediately after a transferring cycle begins, it will be apparent that the roller 109 will move upon the lobe 118, thereby to raise the yoke 113 and the rollers 114 against the collar 115, with the consequence that the shaft 34 and the transfer arms 31 and 32 are raised vertically. At the end of the first half-cycle of transfer, the roller 109 will be forced by the weight of the transfer arms to move down a trailing edge 119 of the lobe 118 and then to rest against the circular dwell 116 for the remaining half cycle.

It will be appreciated, then, that movement of the work carrier 27 may be contemporaneously induced by the cams C-1, C-2 and C-3 acting through independent linkage arrangements. The time sequence of these movements may be conveniently discerned by reference to the timing chart of Figure 7.

Control mechanism

To provide an efficient, yet safeguarded functioning of the transfer device 20 and control the time sequence of punch press operation, conveyor operation, and load and discharge finger operation, the electrical control arrangement illustrated in Figure 6 is, by my invention, incorporated in the above-described transfer device. For effectuating a control of the fingers 35 and 36, the punch press 22 and the supply conveyor 21, a pneumatic system which may suitably be charged with air under pressure is employed and is, in turn, controlled by means now to be described with reference to the movements of the work carrier 27.

A supply conveyor 21 is provided which includes a conveyor belt 120 driven by a pulley 121 journaled on a table 122. Lateral guide rails 123 and a transverse stop bar 124 are supported from the table 122 to guide successive workpieces 24 advanced by the conveyor belt 120 to a position indicated at 125. A workpiece 24 which has arrived at position 125 will be held by the stop bar 124 in line for transverse movement which is effected by a plunger 126 actuated by an air cylinder 127 secured to the table 122, to the work supply station 28.

As illustrated in Figure 1, the ram 126 has been actuated, but due to a hiatus or interruption in the succession of workpiece blanks 24 normally brought to the position 125 against the stop bar 124, no workpiece blank 24 was positioned in the path of the ram 126 at the time of its actuation. In consequence, the cycle of transferring operations beginning with the instance illustrated in Figure 1 is characterized by the absence of a workpiece blank 24 at the load station 28. This may be considered as an abnormal circumstance, viewing as normal the accumulation of a large number of workpiece blanks confined by the guide rails 123 and ready, as is the illustrated workpiece blank 24, to advance to the position 125 for subsequent removal by the ram 126 to the work supply station 28.

The air cylinder 127 for the ram 126 is connected to a source of pressurized air, such as the air pressure line 128 by means of a conduit 129 connected thereto through solenoid valve V–5.

The load fingers 35 and discharge fingers 36 are moved to clamping position by operation of the air cylinders 43 and 44, which are connected to the main air pressure line 128 through a solenoid valve V–4 by conduits 130 and 131, respectively. Closing of the valve V–4 will then leave the springs 39 and 40 unopposed to return the fingers to their open position.

For the purpose of controlling the operation of a machine, such as the punch press 22, with which the transfer device 20 is associated, a control device 132 on the punch press 22 is connected by a conduit 133 through a solenoid valve V–6 to the main pressure line 128. The control device 132 may be any one of several types of pneumatic controls well known in the art, whereby air fed into the control device through the conduit 133 is effective to initiate an operation of the punch press 22. The punch press 22 may suitably be of the one-cycle-of-operation type which is well known to those skilled in the art and which embodies control means such as a one-revolution clutch, or the like, whereby the punch press passes through but a single cycle of operation for each actuation of the control device 132.

*The electrical control*

With particular reference to Figure 6, the timer motor 85 and the solenoid valves V–4, V–5 and V–6 are electrically connected to receive power from a three-phase, three-wire electric power line 134, which suitably may carry A. C. current and have a voltage rating of 220 volts line-to-line. It will be appreciated that any other convenient electrical supply might be used and the circuit elements adapted for energization thereby.

As illustrated in Figure 6, the control circuit is arranged as it would be at the initiation of a normal operating cycle and thus corresponds with the position of the work carrier 27 in Figure 1. The stop switch 135 is closed and the start switch 136 has, at the illustrated instance, been moved from its dotted open position to the full-line closed position. The timer motor 85 is thereby energized through normally open relay motor contacts 137 closed by relay solenoid 138, which solenoid is in series with the start switch 136 and stop switch 135 across an isolation transformer 139 appropriately connected with two wires of the main power line 134. Relay solenoid 140 is also energized to close normally open relay contacts 141 and thereby to energize a bus 142. As the start switch 136 and stop switch 135 are suitably push-button operated, holding contacts 143 are closed by the relay solenoid 138 to short out the start switch 136. Consequently, upon closing of the start switch 136, the timer motor 85 begins continuous rotation of the cam shaft 80, while the bus 142 is energized by closure of the relay contacts 141 and serves with a bus 147 to supply current from the isolation transformer 139 to certain additional electrical apparatus.

This additional apparatus includes the normally closed solenoid valves V–4, V–5 and V–6 which control the air pressure actuation, respectively, of the load and unload fingers 35 and 36, the supply conveyor ram 126, and the punch press 22. As seen in Fig. 6, the solenoid valves V–4, V–5 and V–6 are connected through cam operated switches 144, 145 and 146, respectively, to switch buses 148 and 148a which, in turn, are connected through relay contacts 149 and 153 to the bus 142. The switches 144, 145 and 146 are operated, respectively, by cams C–4, C–5 and C–6 to sequentially operate the respective valves V–4, V–5 and V–6 during each cycle. As will now appear, the interposition of the switch buses 148, 148a and the relay contacts 149 and 153 between the solenoid valves and the bus 142 prevents improper starting of the device.

By the closing of the relay contacts 141, the switch bus 148 may be impressed with a voltage through relay contacts 149. These contacts 149 are controlled by a relay solenoid 150 which is connected through contacts 151 of the switch 144 across the bus 142 and a bus 152 of opposite polarity. To this bus 152 each of the solenoid valves is connected. It will be observed that once voltage has been applied to the switch bus 148 by energization of the relay 150, such voltage will not be removed so long as there is voltage between the buses 142 and 152, since holding contacts 153 will keep the relay 150 energized and its contacts 149 closed, while also continuing energization of the switch bus 148a.

Referring now to Figure 5, the contacts 151 which control the initial energization of the buses 148 and 148a will be closed throughout each second half-cycle of a transfer operation, since during each such period a follower 144a of the switch 144, which is biased upwardly against a circular dwell 154 of the cam C–4 will hold the contacts 151 closed. Thus, during a second half-cycle, while the transfer arms 31 and 32 are rotating clockwise to their pick-up position, the switch buses 148 and 148a may be initially energized.

As a preventative against energizing the switch buses 148, 148a initially during a first half-cycle of transfer operation, the contacts 151 of the switch 144 are opened during this period by the downward movement of the follower 152 onto a circular lobe 154a of the cam C–4. Since contacts 155 are closed only during each first half cycle and the solenoid valve V–4 can only be energized to open when these contacts 155 are closed, it is apparent that the solenoid valve V–4 will first open only at the initiation of a cycle of operation. By this arrangement, then, the load fingers 35 and the discharge fingers 36 will not be moved to clamping position by opening of the solenoid valve V–4 after the device has been started, until the fingers are positioned at the load station 28 and the discharge station 29, respectively. A normal commencement of the cycles of operation is thereby assured.

It will be recalled that Figures 5 and 6 are illustrative of the conditions at the instant of initiation of a cycle of operation, which instant may be related with the zero line on the timing chart of Figure 7. Shortly after the illustrated instant, the roller 144a by moving upon the circular lobe 154a will close the contacts 155 to energize and open the solenoid valve V–4, thereby causing the load fingers 35 and the discharge fingers 36 to move, by air pressure actuation, toward their clamping position. Thus, the fingers 35 and 36 are in clamping position whenever the transfer arms 31 and 32 are moving in their counter-clockwise direction. On the return, clockwise movement of the transfer arms 31 and 32 during each second half cycle, the fall of the roller 144a to the circular dwell 154 of the cam C–4 will open the contacts 155 and de-energize the solenoid valve V–4. It follows then, as graphed in Figure 7, that the fingers will be closed during each first half cycle and open during each second half cycle.

To sequentially operate the solenoid valve V–5 for actuation of the ram 126, the cam operated switch 145 includes a follower 156 which holds the contacts 157 open during slightly more than the first half cycle by engagement with a circular dwell 158 of the cam C–5. During the remaining portion of the second half cycle, the movement of the follower 156 upon a circular lobe 159 will cause the contacts 157 to open, thereby energizing solenoid valve V–5 and causing pressurized air to flow from the main air line 128 into the air cylinder 127. The ram 126 will then advance a workpiece blank 24 at position 125 to the supply station 28. If there is no workpiece 24 at the position 125, as illustrated in Figure 1, there will be no workpiece blank 24 positioned at the supply station 28 to be clamped between the load fingers 35 for transport over to the press station 29.

As is apparent in the timing chart of Figure 7, the ram is advanced to move a workpiece blank 24 to the supply station 28 during each second half cycle while the transfer arms 31 and 32 are being returned by a clockwise rotation.

To initiate operation of the punch press 22, the solenoid valve V-6 in the air pressure line 133 to the punch press control device 132 is energized through contacts 160 of the switch 146. As is apparent in Figure 5, a switch operating follower 161 holds the contacts 160 open as it rides upon a circular dwell 162 of the cam C-6. During the middle portion of the second half cycle, however, the follower 161 moves upon the lobe 163 to provide the necessary momentary actuation of the punch press control device 132. It will be apparent, then, that the punch press 22, or such other machine as may be associated with the transfer device 20, will perform an operation upon a workpiece blank 24 during each second half cycle of operation when the transfer arms 31 and 32 are in substantially the full line position illustrated in Figure 2. At this full line position of the transfer arms, the load fingers 35 and the discharge fingers 36 are completely clear of the punch press station 29 and cannot be injured by such operation of the punch press 22.

Should a manual initiation of the punch press operation be desired during any portion of the cycle or when the transfer device is not functioning, a jog switch 164 located remotely from the transfer device, if desired, may be closed to energize and open the solenoid valve V-6.

Except for certain safety arrangements, the character of which will appear shortly, I have now described a completely automatic, electrically controlled transfer device which functions through successive identical cycles of workpiece transfers as graphed in the timing chart of Figure 7. Perfect sequencing and coordination of various portions of my transfer device is insured by the positive actuation of the linkage actuating cams C-1, C-2 and C-3 and the switch actuating cams C-4, C-5 and C-6, all of which cams are co-rotatively secured to the cam shaft 80. I have especially provided relay control means to insure that initiation of the transfer operations occurs at the beginning of an operating cycle, as in Figure 1, to thereby prevent an unnecessary operation of the safety features now to be discussed.

Safety control device

Processing machines such as punch presses to which workpieces are manually fed must constantly be supervised to prevent operation of the punch press or like machine when a workpiece is improperly positioned or entirely absent. In the present transfer device 20, I have provided condition sensitive means to interrupt the operation of the transfer device upon the occurrence of a dislodgment or absence of a finished workpiece 24a at the punch press station 29. Preferably, the operation of the machine, such as the punch press 22, is also halted by such occurrence, as it is in the presently disclosed exemplary embodiment of my invention. In the case of punch press operations, this condition sensitive means, for example, responds to jamming of a workpiece in a lower die 166 or to seizing and carrying away of the workpiece by an upper movable die (not shown) and acts to prevent any subsequent operation of the punch press 22 and to discontinue the supplying of workpieces to the punch press station 29 by the transfer device 20.

As is illustrated with clarity in Figure 1, this condition responsive safety means is associated with the work discharge turret 26 and comprises a normally closed limit switch 167 carried on a platform 168 secured and extending from the turret 26 to position the switch operating plunger 169 in contact with the end portion 170 of the finger actuating air cylinder plunger 42. The switch actuating plunger 169 is biased against the end portion 170 but, as illustrated, is held in its inward position by reason of the retraction of the air cylinder plunger 42 for lack of air pressure in the air cylinder 44. With the discharge fingers 36 in their open position, as in Figure 1, the switch actuating plunger 169 is pushed by the end portion 170 of the air cylinder plunger 42 to hold contacts 171 of the switch 167 closed, in the full position in Figure 6.

Significantly, the contacts 171 will remain closed unless pressurization of the air cylinder 44 occurs when the finished workpiece 24a is not properly positioned at the punch press station 29 to be clamped between the discharge fingers 36. Upon such an abnormal occurrence the discharge fingers 36 will be forced by the advance of the wedge-headed plunger 42 to a measurably closer spacing than that which exists when a finished workpiece is clamped properly between the fingers. The additional advance of the plunger 42 permits the switch actuating plunger 169 to move to its biased open position, opening contacts 171.

It will be seen in Figure 6 that the contacts 171 of the condition responsive switch 167 are in series with the start switch 136 and the stop switch 135 in the circuit which energizes the motor relay 138 and the relay 140 for the bus 142. Opening of the contacts 171 of the condition responsive safety switch 167, then, will operate just as would opening of the stop switch 135, namely, to stop the timer motor, to de-energize the solenoid valves V-5 and V-6 and consequently to completely stop operations of the transfer device 20 and the punch press 22. It is to be noted, however, that the fingers 35 and 36 may remain clamped to prevent the dropping of any workpiece that is then being carried by reason of continuing energization of the bus 148a. Only by removing the abnormal condition and by closing the start switch 136 will their operations be resumed.

It will be apparent that the condition responsive switch 167 may be associated with the work carrier 27, or with the punch press 22 or like machine, in other manners than that here illustrated and described so as to prevent a destructive continuation of operations of either the transfer device 20 or the machine with which it is associated. As to the association of the punch press 22 with the transfer device 20, it will be apparent that the condition responsive safety switch 167 is particularly effective in supervision of the punch press and work transfer operations.

Means for disabling safety device

I have also provided means for disabling this condition sensitive safety device under circumstances where continuing operation of the transfer device 20 and the punch press 22 is both safe and desirable. Thus, operations might be continued while the supply of workpieces is temporarily depleted even though the resulting absence of a finished workpiece 24a at the punch press station 29 would normally cause opening of the safety switch contacts 171 and halting of all further operations.

This means for disabling the safety device includes the solenoid relay 172 which, when energized, operates after a time delay, shown as T on the timing chart, to close the normally open switch bar 173, to thereby shunt the safety switch contacts 171. The shunting of the safety switch contacts 171 suffices, it will be appreciated, to disable the safety device and to prevent unnecessary termination of the operating cycle. Whenever the shunting relay 172 is not energized, however, the safety switch 167 will be effected to stop a transfer cycle if the discharge fingers 36 should move together beyond their normal workpiece clamping position in the absence of a workpiece 24a.

It will be evident that the shunting relay solenoid 172 is energized by the buses 142 and 144 when contacts 174 of relay 175 are closed. The relay 175 will be energized, in turn, by the buses 142 and 144 through normally closed contacts 176 of the shunting relay 172 whenever normally open contacts 177 of a second condition sensitive limit switch 178 are closed.

The condition sensitive limit switch 178, which thus controls the disabling of the safety switch 167, is associated with the load turret 25, but otherwise supported and constructed exactly as is the safety switch 167. The limit switch 178 is supported on a platform 179 extending from and attached to the work load turret 25, so that the switch actuating plunger 180 will be biased to contact the end portion 181 of the air cylinder plunger 41. Normally, as in Figure 1, the switch actuating plunger 180 is in its retracted position and the contacts 177 are open, as illustrated in full lines in Figure 6. However, upon the occurrence of a hiatus in the succession of workpiece blanks 24 supplied by the ram 126 to the work load station 28, the work load fingers 35 will be clamped together to the dotted position shown in Figure 2 to close the contacts 177.

An alternative arrangement for both the load and discharge turrets, whereby the associated condition-sensitive switches may be mounted on the transfer arms, is exemplified in Figure 8. A modified work load member 25a is here supported for rotation on the transfer arm 31 as a turret, and its air cylinder 43a is connected through air hose 130a and swivel coupling 188 to a swivel coupling 189 on the arm 31. When the solenoid valve V-4 is operated to supply pressure to the air cylinder 43a, plunger 41a, acting through connecting links 190, will move chuck members 191 and fingers 35a releasably held thereby inwardly about pin 37a to a clamping position limited by stops 192. If no workpiece is in place for clamping, a camming arm 193 secured to the clockwise chuck member 191 will have its arcuate cam face 194 brought into actuating contact with the normally open condition-sensitive switch 178a to close the same. As the turret 35a rotates counterclockwise, the switch 178a will remain closed only for the time interval represented by the clockwise extension of the cam face 194 which is concentric with the turret 25a. This interval suffices for closure of relay holding contacts 186. The fingers 35a subsequently will reopen under a spring bias on the plunger 41a.

It will be understood that the work discharge member 26 may be modified in the same way, so that the safety switch may be secured to the arm 32 and cam-operated upon an over travel of the clamping fingers for a sufficient time to deenergize the timer motor 85 and the relay 140. Both the memory circuit and the safety circuit, accordingly, will perform their respective functions with either embodiment of the turrets, it being clear that the disabling and safety switches need only be operable at the beginning of each cycle. With the embodiment of Figure 8, however, the safety and disabling switches may operate only at the beginning of a cycle.

As will now be seen, the safety switch 167 will be disabled until such time as a workpiece blank 24 arriving at the work supply station 28 is deposited at the punch press station 29.

It will be apparent in Figure 6 that the safety switch contacts 171 will remain shunted by the relay contacts 173 after the contacts 177 have once closed, at least as long as contacts 174 of the relay 175 are closed by the energization of relay 175. Relay 175, in turn, will remain energized despite opening of the contacts 176 by reason of the preceding closure of contacts 182 of limit switch 183 supported by the top wall 65 of my device. Operation of this limit switch 183 is controlled by engagement of the outwardly biased switch actuating plunger 184 with the dog 185 secured for co-rotation with the transfer arms. Thus, as the transfer arms begin their counterclockwise movement, the contacts 182 of limit switch 183 move to their normally closed position to prevent deenergization of the relay 175 by a subsequent opening of the relay contacts 176.

When the transfer arms begin their return, clockwise movement and the load and discharge fingers 35 and 36 are opened, the contacts 177 of the disabling switch 178 will open. By reason of the relay holding contacts 186, however, the open contacts 177 will be shunted and the relay 175 will remain energized. When the transfer arms have almost returned to their initial position, illustrated in Figure 1, the dog 185 will act to open the limit switch contacts 182 again and at that time the relay 175 will be deenergized and contacts 174 will open.

An alternative current supply to the shunting relay 172 is, however, provided through its holding contacts 187 and through contacts 184 of the cam operated switch 146. The purpose of this alternative source of current to the shunting relay 172 is that of keeping the safety switch contacts 171 shunted until a workpiece arrives at the machine station 29. Since the contacts 184 open only when the punch press operating contacts 160 close, that is, at the third quarter of each operating cycle, it is evident that the safety switch 167 will be disabled at least until the third quarter of the cycle when a workpiece is again received at the supply station 28. By that time, this so received workpiece will be positioned at the punch press station 29 and will undergo a pressing operation.

At the end of each succeeding cycle, then, the relay 175 is deenergized to prepare the shunting relay 172 for denergization. If workpieces do not appear at the supply station 28, the relay 175 is once again energized so that the device continues through another cycle. If, on the other hand, a workpiece appears at the supply station, the disabling switch contacts 177 will remain open, the relay contacts 174 will accordingly remain open, and the shunting relay 172 will then be deenergized in the third quarter of the cycle when contacts 184 also open. At such time, the control circuit will be returned to its normal operating condition with the safety switch 167 in operative order.

*Summary*

It will be apparent from the foregoing description that I have provided a control arrangement for a transfer device such that closing of the start switch initiates cyclic operations of the device at the beginning of a cycle, that is, when the transfer arms 31 and 32 are positioned at the supply station 28 and the machine station 29, respectively. This control arrangement also causes a machine associated with the transfer device to operate in timed sequence with the operations of the transfer device.

My control arrangement is further characterized as providing for a complete cessation of operations of the transfer device and any associated machine upon the occurence of an abnormal condition at the workpiece station on the machine. Such abnormal condition, which may be the absence of a workpiece at the machine station, is responded to by a condition sensitive safety switch carried on the discharge arm 32.

If, during the normal course of cyclic operations on workpieces, there occurs a temporary interruption in the supply of workpieces and no workpiece is positioned at the supply station at the beginning of a cycle, a condition sensitive disabling switch on the load arm 31 operates to disable the safety switch to prevent its operation during the next succeeding cycle and such further cycles as are also characterized by the absence of a workpiece at the supply station. Within the first cycle thereafter at the beginning of which a workpiece appears at the supply station, the safety switch is made operative again and the control arrangements are otherwise restored to their normal condition.

Thus, in the two cycles of operation diagrammatically presented in Figure 7, the first cycle of operation is characterized by the absence of a workpiece at the supply station at the beginning of the cycle. At the beginning of the second cycle, a workpiece arrives at the supply station and, by the conclusion of the second cycle, the control arrangement has been restored to its normal condition. The safety switch is disabled then throughout the time when the shunting contacts 173 of relay 172 are closed, as indicated at the bottom of Figure 7.

Except for manual actuation of the start, stop or jog switches, no personal supervision of my device is required to insure continuing cyclic operations. If an abnormal condition occurs which would likely be harmful to a workpiece or to the processing machine, both the transfer device and the machine are immediately and automatically stopped. Only when an interruption in the supply of workpieces occurs and the abnormal condition then ensuing is not likely to produce harm is the safety arrangement responsive to this abnormal condition made inoperative. When a supply of workpieces is again received at the transfer device and the abnormal condition is thereby removed, my control arrangement returns to its normal condition responsive to abnormal harmful conditions.

Although I have described the very efficient control arrangement of my invention in connection with a preferred embodiment thereof, many variations and modifications may be resorted to by those skilled in the art without departing from the principles and spirit of my present invention. I consider all of these modifications and variations as within the true spirit and scope of the present invention as described in the specification and defined by the present claims.

I claim as my invention:

1. In an article transferring device, a turret, article pickup fingers pivotally mounted on said turret, a plunger with a wedge-shaped head movable against said fingers to force said fingers into clamping position, a normally open safety switch engaging said plunger and held closed thereby, said switch being positioned to open upon over travel of said plunger in the absence of an article for clamping by said fingers, electric time control means energized through said safety switch, and means for moving said plunger actuated by said control means, said switch operating when opened to prevent actuation of said plunger moving means.

2. In a device for transferring workpieces from a machine station to a discharge station, a discharge turret movable between said stations, workpiece clamping fingers carried by said turret and spring biased to an open position, a plunger engaging said fingers to move said fingers to a clamping position, a limit switch having a switch actuating member engageable with said plunger to operate said switch upon over travel of said plunger, and control means for sequencing movement of said fingers and turret, which means are deenergized by operation of said switch.

3. In a device for transferring workpieces to and from a machine, a workpiece load member movable between a supply station and the machine, a workpiece discharge member contemporaneously movable between the machine and a discharge station, electric timer means controlling movement of said members, clamping fingers on each of said members controlled by said electric timer means to clamp upon a workpiece during forward movement of said members and to open during their return movement, said electric timer means also controlling operation of the machine to cause its operation only during return movement of said members, a safety switch carried by said discharge member and operated by over-clamping of the fingers thereof in the absence of a workpiece to prevent operation of the machine by said electric timer means, a disabling switch associated with said load member and actuated by overclamping of the fingers thereof, a relay operated by actuation of said disabling switch to shunt said safety switch, a relay holding circuit energized by said disabling switch to continue operation of said shunting relay, a limit switch operated by return movement of said load and discharge members to the supply station and the machine, respectively, to deenergize said relay holding circuit, and switch means controlled by said electric timer means to deenergize said shunting relay upon the next operation of the machine upon a workpiece.

4. In an article transferring device, a transfer arm, a turret rotatably supported on said transfer arm, article pickup members pivotally mounted on said turret, a plunger connected to said pickup members to move the same between an open and a clamped position, a camming arm secured to one of said pickup members for movement therewith and having an arcuate cam face, and a condition sensitive switch on said transfer arm positioned adjacent said cam face to be actuated thereby during rotation of said turret when said pickup members overtravel their article clamping position due to absence of an article to be clamped.

5. In a device for transferring workpieces to and from a machine, a load pick-up member movable between a supply station and a machine station, a discharge pick-up member movable between said machine station and a discharge station, electric means controlling movement of said load and discharge pick-up members in operation of said machine, clamping fingers on each of said members controlled by said electrical means to clamp upon a workpiece and capable of overclamping movement in the absence of a workpiece, a safety switch carried by said discharge member and having normally closed safety contacts opened by overclamping of the fingers thereof in the absence of a workpiece to deenergize said electrical control means, normally open contacts shunting said normally closed safety contacts, a disabling switch associated with said load member and actuated by overclamping of the fingers thereof to close said normally open contacts to shunt said normally closed safety contacts.

6. In a device for transferring workpieces to and from a machine, a workpiece load member movable between a supply station and the machine, a workpiece discharge member contemporaneously movable between the machine and a discharge station, electrical timer means controlling movement of said members, clamping fingers on each of said members controlled by said electric timer means to clamp upon a workpiece during forward movement of said members and to open during their return movement and capable of overclamping movement in the absence of a workpiece, said electrical timer means also controlling operation of the machine to cause its operation only during return movement of said members, a safety switch carried by said discharge member and operated by over-clamping of the fingers thereof in the absence of a workpiece to open normally closed safety contacts to prevent operation of the machine by said electric timer means, a disabling switch associated with said load member and actuated by overclamping of the fingers thereof to close a pair of normally open disabling contacts, a holding relay energized by closure of said normally open disabling contacts, a disabling relay operated by actuation of said holding relay to close a pair of normally open contacts shunting said normally closed contacts of said safety switch, a holding circuit for said holding relay shunting said normally open contacts of said disabling switch, and a limit switch for controlling the holding circuit for the holding relay to deenergize the holding relay upon return movement of said members to interrupt the energizing circuit for said disabling relay, a holding circuit for said disabling relay, and switch means controlled by said electric timer means to open said holding circuit for said disabling relay to deenergize said disabling relay upon the next operation of the machine upon a workpiece.

7. In a device for transferring workpieces to and from a machine, a load pick-up member movable between a supply station and a machine station, a discharge pick-up member movable between said machine station and a discharge station, electrical means controlling movement of said load and discharge pick-up members and operation of said machine, clamping fingers on each of said members controlled by said electrical means to clamp upon a workpiece and capable of overclamping movement in the absence of a workpiece, safety switch means on said discharge pick-up member actuated by overclamping movement of the clamping fingers of said discharge pick-up member in the absence of a workpiece at the machine station to de-energize said electrical control means, and switch means on said load pick-up member responsive to the overclamping movement of the clamping fingers on said load pick-up member in the absence of a workpiece at the supply station to disable said safety switch means until a workpiece is received at the machine station.

8. In a device for transferring workpieces to and from a machine, load pickup means movable between a supply station and a machine station, discharge pickup means movable between said machine station and a discharge station, safety switch means on said discharge pickup means having an open circuit and a closed circuit condition, means associated with said discharge pickup means and operatively connected to said safety switch means and operative to hold said safety switch means in one of its conditions during engagement of said discharge pickup means with a workpiece at said machine station and being operative to hold said safety switch means in the other of its conditions upon failure of said discharge pickup means to engage a workpiece at the machine station, means for moving said load pickup means and said discharge pickup means, means controlled by said safety switch means in its one condition to accommodate energization of said moving means and controlled by said safety switch means in its other condition to normally prevent energization of said moving means, disabling switch means on said load pickup means having an open circuit and a closed circuit condition, means associated with said load pickup means and operatively connected to said disabling switch means and operative to hold said disabling switch means in one of its conditions during engagement of said load pickup means with a workpiece at the supply station and operative to hold said disabling switch means in the other of its conditions upon failure of said load pickup means to engage a workpiece at the supply station, and means controlled by movement of said disabling switch means to its other condition to accommodate energization of said moving means independently of said safety switch means.

9. In a device for transferring workpieces to and from a machine, fluid pressure operated article pickup means operable to grasp workpieces at a machine station, solenoid valve means controlling grasping movement of said pickup means, switch means controlling operation of said solenoid valve means, cam means controlling said switch means to time operation of said valve means in accordance with a predetermined cycle of operation, motor means driving said cam means, safety switch means controlling the energizing circuit for said motor means, and means operative to actuate said safety switch means to open the motor energizing circuit and responsive to failure of said article pickup means to grasp an article at the machine station to actuate said safety switch means.

10. In a device for transferring workpieces to and from a machine, fluid pressure operated article pickup means operable to grasp workpieces at a machine station, solenoid valve means controlling grasping movement of said pickup means, switch means controlling operation of said solenoid valve means, cam means controlling said switch means to time operation of said valve means in accordance with a predetermined cycle of operation, motor means driving said cam means, safety switch means controlling the energizing circuit for said motor means, means operative to actuate said safety switch means to open the motor energizing circuit and responsive to failure of said article pickup means to grasp an article at the machine station to actuate said safety switch means, further article pickup means for grasping a workpiece at a supply station and delivering the workpiece to the machine, disabling switch means controlling a circuit for energizing the motor means independently of the safety switch means, and means responsive to failure of said further article pickup means to grasp a workpiece at the supply station to actuate said disabling switch means to cause said motor means to continue operation in spite of a hiatus in the supply of workpieces to the supply station.

11. In a device for transferring workpieces from a machine, discharge pickup means for grasping a workpiece at a machine station and movable between said machine station and a discharge station, electrical means controlling movement of said discharge pickup means and controlling operation of the machine, safety switch means on said discharge pickup means controlling said electrical means, and means operated during closing movement of said article pickup means upon overtravel in the absence of a workpiece to actuate said safety switch means to de-energize said electrical means.

12. In a device for transferring workpieces to and from a machine, load grasping means movable between a supply station and a machine station, discharge grasping means movable between said machine station and a discharge station, electrical means controlling movement of said load and discharge grasping means and operation of said machine, safety switch means on said discharge grasping means controlling said electrical means, means connected to said grasping means and to said safety switch means and operative during closing movement of said discharge grasping means upon overtravel in the absence of a workpiece to actuate said safety switch means to deenergize said electrical means, disabling switch means on said load grasping means and controlling a circuit for energizing said electrical means independently of said safety switch means, and means connected to said load grasping means and to said disabling switch means and operative during closing movement of said load grasping means upon overtravel in the absence of a workpiece to actuate said disabling switch means to accommodate continued energization of said electrical means in spite of a temporary hiatus in the supply of workpieces to the supply station.

13. In a device for transferring workpieces to and from a machine, mechanism for transferring workpieces from the machine, safety control means controlling operation of said mechanism, means operatively associated with said mechanism and actuated by failure of the mechanism to grasp a workpiece for transfer from the machine to actuate said safety control means, disabling means controlling operation of said mechanism independently of said safety control means, and means for sensing the failure of said mechanism to grasp a workpiece for transfer to the machine to actuate said disabling means to accommodate operation of said mechanism independently of said safety control means.

14. In combination, means for transferring workpieces to and from a machine, means for controlling operation of said machine during each cycle of said transferring means, first and second control circuits for independently controlling said controlling means, safety means controlling said first control circuit and operable upon actuation thereof to normally prevent operation of the machine, means responsive to an abnormal condition indicating operation of the machine to be unsafe to actuate said safety means to normally prevent operation of said machine, disabling means controlling said second control circuit and operative upon actuation thereof to complete the second control circuit to operate said machine independently of said first control circuit, and means responsive to a predetermined condition indicating operation of the machine to be safe in spite of the presence of the abnormal condition to actuate said disabling means to allow operation of the machine independently of the safety means.

15. In combination, first means for transferring workpieces from a supply station to a machine station, second means for transferring workpieces from said machine station to a discharge station, safety control means controlling operation of said first and second transferring means, means operatively associated with said second transferring means and operated by failure of said second transferring means to engage a workpiece at said machine station to actuate said safety control means to prevent operation of said transferring means, disabling means operative to disable said safety control means to accommodate continued operation of said transferring means, and means operatively associated with said first transferring means and actuated by failure of said first transferring means to engage a workpiece at the supply station to actuate said disabling means and thereby accommodate continued operation of said transferring means independently of said safety control means.

References Cited in the file of this patent

UNITED STATES PATENTS

| | | |
|---|---|---|
| 1,043,640 | Stephan et al. | Nov. 5, 1912 |
| 1,834,499 | Richter | Dec. 1, 1931 |
| 1,884,861 | Remde | Oct. 25, 1932 |
| 1,933,226 | Smith et al. | Oct. 31, 1933 |
| 1,985,563 | FitzGerald | Dec. 25, 1934 |
| 2,303,040 | Gischel | Nov. 24, 1942 |
| 2,412,845 | Stevens | Dec. 17, 1946 |
| 2,609,106 | Tesch | Sept. 2, 1952 |
| 2,609,954 | Sutherland et al. | Sept. 9, 1952 |
| 2,696,918 | Arelt | Dec. 14, 1954 |